United States Patent [19]

Gioutsos et al.

[11] Patent Number: 5,563,791
[45] Date of Patent: * Oct. 8, 1996

[54] ENVELOPE DETECTOR USEFUL IN CRASH DISCRIMINATION

[75] Inventors: Tony Gioutsos, Brighton; Daniel N. Tabar, Troy; Edward J. Gillis, South Lyon, all of Mich.

[73] Assignee: Automotive Systems Laboratory, Inc., Farmington Hills, Mich.

[ * ] Notice: The portion of the term of this patent subsequent to Aug. 9, 2011, has been disclaimed.

[21] Appl. No.: 329,080

[22] Filed: Oct. 25, 1994

[51] Int. Cl.$^6$ ............................. B60R 21/02; B60R 21/32
[52] U.S. Cl. .................. 364/424.05; 340/669; 307/10.1; 280/734; 180/282
[58] Field of Search ...................... 364/424.05; 307/10.1; 340/436, 669; 280/734, 735; 180/274, 282

[56] References Cited

U.S. PATENT DOCUMENTS

| | | | |
|---|---|---|---|
| 4,410,875 | 10/1983 | Spies et al. | 280/735 |
| 4,497,025 | 1/1985 | Hannoyer | 364/424.05 |
| 4,975,850 | 12/1990 | Dillen | 364/424.05 |
| 5,068,793 | 11/1991 | Condne et al. | 364/424.05 |
| 5,309,138 | 5/1994 | Tohbaru | 340/436 |
| 5,337,238 | 8/1994 | Gloutsos et al. | 364/424.05 |
| 5,339,242 | 8/1994 | Reid et al. | 364/424.05 |
| 5,363,302 | 11/1994 | Allen et al. | 364/424.05 |

FOREIGN PATENT DOCUMENTS

93/07573 4/1993 WIPO ............................ B60R 21/08

*Primary Examiner*—Kevin J. Teska
*Assistant Examiner*—Tyrone V. Walker
*Attorney, Agent, or Firm*—Lyman R. Lyon

[57] ABSTRACT

A system (10) and method for detecting an envelope of received vehicle acceleration information (a(t)) useful in controlling actuation of a vehicle passenger safety device, wherein consecutive values for received vehicle acceleration information (a(t)) are stored and rank-ordered in a pair of rank-order filters (14, 16) to provide a highest-ranked value ($a_H$) from among the most-recent half of the stored values, and a highest-ranked value ($a_H'$) from among the least-recent half of the stored values. The absolute value of the highest-ranked least-current value is taken and subtracted from the highest-ranked most-recent value to obtain a modified jerk measure ($j_H^*$). The absolute value of the thus-generated modified jerk value is taken to obtain a measure ($m_1$) which tracks the envelope of the received acceleration information and, hence, is useful as an envelope detector when evaluating a crash waveform for purposes of controlling actuation of the safety device.

3 Claims, 1 Drawing Sheet

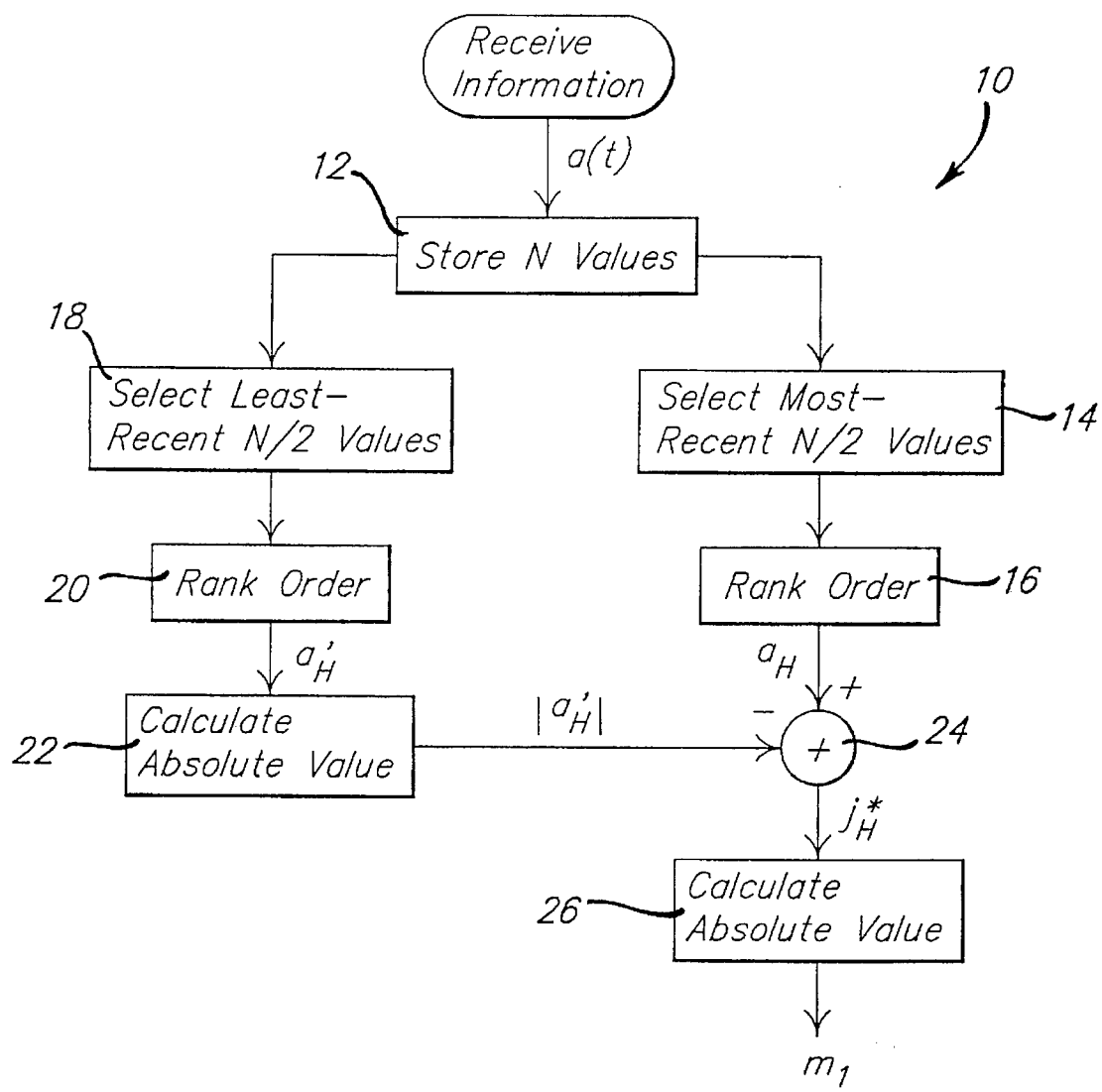

ENVELOPE DETECTOR USEFUL IN CRASH DISCRIMINATION

BACKGROUND OF THE INVENTION

The instant invention relates to systems and methods for controlling the actuation of vehicle passenger safety devices in response to an event possibly requiring such actuation of the safety device and, more particularly, to systems and methods wherein the envelope of the received acceleration information is useful in controlling actuation of the safety device.

A variety of systems and methods for actuating vehicle safety devices are well known in the art. Such systems are used to sense an event such as a crash condition and, in response to such an event, to actuate an air bag, or lock a seat belt, or actuate a pretensioner for a seat belt retractor. Typically, the safety device is actuated into its protective position when an impact exceeding a predetermined magnitude is detected by the actuating system, as when one or more measures exceed their respective thresholds.

Such known systems and methods for controlling actuation of vehicle safety devices typically track each discrimination measure continuously, i.e., microscopically, with little ability to discern broader trends which might be generated through examination, for example, of the envelope of the received acceleration information. And, since transitory values for acceleration information and/or the measures derived therefrom may reflect localized events such as the crush of a structural portion of the vehicle, broad trends become increasingly important as crash discrimination algorithms attempt to provide different levels of response based upon the detected nature of the crash.

SUMMARY OF THE INVENTION

It is an object of the instant invention to provide an improved system and method for detecting an envelope of received vehicle acceleration information, as might be useful in controlling actuation of a vehicle passenger safety device.

Another object of the instant invention is to provide an improved system and method for detecting an envelope of received vehicle acceleration information whose utility in crash discrimination is not otherwise diminished when based in part on negative acceleration values.

Under the invention, consecutive values for received acceleration information are stored and rank-ordered to provide a first highest-ranked value from among the most-recent half of the stored values, and a second highest-ranked value from the least-recent half of the stored values. The absolute value of the second highest-ranked stored acceleration value is taken and subtracted from the first highest-ranked stored acceleration value to obtain a modified jerk value. The absolute value of the thus-generated modified jerk value is thereafter taken to provide a measure which tracks the envelope of the received acceleration information and, hence, is useful as an envelope detector when evaluating a crash waveform for purposes of controlling actuation of the safety device.

BRIEF DESCRIPTION OF THE DRAWING

The drawing contains a diagrammatic schematic of an exemplary implementing circuit for detecting the envelope of received vehicle acceleration information in accordance with the invention, as might be useful in controlling actuation of a vehicle passenger safety device.

DETAILED DESCRIPTION OF THE PREFERRED EMBODIMENT

Referring to the drawing, a diagrammatic schematic of an exemplary implementing circuit 10 for detecting the envelope of received vehicle acceleration information a(t) itself generated as through use of an acceleration sensor (not shown) includes a storage means 12, such as a RAM, responsive to the received vehicle acceleration information a(t) for storing the most-recent N values thereof. The most recent N/2 values stored in the RAM 12 are provided by a first stored-value selecting means 14 to a first rank-order filter 16 which in turn outputs the highest-ranked value $a_H$ from among those most-recent stored values. The least-recent N/2 values stored in the RAM 12 are provided by a second stored-value selecting means 18 to a second rank-order filter 20 which similarly outputs the highest-ranked value $a_H'$ from among those least-recent stored values.

A first calculating means 22 responsive to the highest-ranked least-recent stored acceleration value $a_H'$ thereafter generates its absolute value $|a_H'|$; whereupon the thus-generated absolute value $|a_H'|$ of the highest-ranked least-recent stored acceleration value $a_H'$ is subtracted from the highest-ranked most-recent stored value $a_H$ in a summing junction 24. The output of the summing junction 24, which may itself be conceptually regarded as a modified jerk measure $j_H^*$ ("modified" in that the time interval over which the acceleration is differentiated varies to accommodate the highest-ranked "current" and "past" acceleration values), is input to a second calculating means 26. The second calculating means 26 generates the absolute value of the modified jerk measure $j_H^*$ to obtain the desired envelope detector $m_1$ useful in tracking broad trends in the received vehicle acceleration information a(t).

While the preferred embodiment of the invention has been disclosed, it should be appreciated that the invention is susceptible of modification without departing from the spirit of the invention or the scope of the subjoined claims.

We claim:

1. A system for detecting an envelope of vehicle acceleration information received over successive sampling periods comprising:

means for storing consecutive values for said received information during each sampling period to provide a plurality of stored values;

means for selecting the most-recent half of said stored values to obtain a first set of values;

means for rank-ordering the values in said first set to obtain the highest-ranked value in said first set;

means for selecting the least-recent half of said stored values to obtain a second set of values;

means for rank-ordering the values in said second set to obtain the highest-ranked value in said second set;

means for generating the absolute value of the highest-ranked value in said second set;

means for subtracting said generated absolute value from the highest-ranked value in said first set to obtain a modified jerk measure; and means for generating the absolute value of said modified jerk measure, wherein said absolute value of said modified jerk measure is representative of an envelope value.

2. A method for detecting an envelope of received vehicle acceleration information comprising the steps of:

storing said received information over time to obtain a plurality of stored values for said received information;

selecting the most-recent half of said stored values to obtain a first set of values;

rank-ordering the values in said first set to obtain the highest-ranked value in said first set;

selecting the least-recent half of said stored values to obtain a second set of values;

rank-ordering the values in said second set to obtain the highest-ranked value in said second set;

generating the absolute value of the highest-ranked value in said second set;

subtracting said generated value from the highest-ranked value in said first set to obtain a modified jerk measure; and generating the absolute value of said modified jerk measure, wherein said absolute value of said modified jerk measure is representative of an envelope value.

3. A method of tracking trends in transitory information generated by a vehicle acceleration sensor comprising the steps of:

generating a signal representative of an envelope of said generated transitory acceleration information; and outputing said signal to a vehicle crash discrimination system for analysis, wherein said step of generating a signal representative of an envelope further comprises the steps of:

storing said transitory information generated over a sampling period to obtain a plurality of stored values for said transitory information;

selecting the most-recent half of said stored values to obtain a first set of values;

rank-ordering the values in said first set to obtain the highest-ranked value in said first set;

selecting the least-recent half of said stored values to obtain a second set of values;

rank-ordering the values in said second set to obtain the highest-ranked value in said second set;

generating the absolute value of the highest-ranked value in said second set;

subtracting said generated value from the highest-ranked value in said first set to obtain a modified jerk measure; and generating the absolute value of said modified jerk to produce said signal representative of the envelope.

* * * * *